(No Model.)  6 Sheets—Sheet 1.

S. G. HOWE.
CAR COUPLING.

No. 369,523.  Patented Sept. 6, 1887.

WITNESSES
Samuel E. Thomas
N. S. Wright

INVENTOR
Solon G. Howe
By W. W. Leggett,
Attorney (No Model.) 6 Sheets—Sheet 2.

S. G. HOWE.
CAR COUPLING.

No. 369,523. Patented Sept. 6, 1887.

WITNESSES
Samuel C. Thomas
N. S. Wright

INVENTOR
Solon G. Howe
By W. W. Leggett
Attorney (No Model.) 6 Sheets—Sheet 3.

S. G. HOWE.
CAR COUPLING.

No. 369,523. Patented Sept. 6, 1887.

WITNESSES
Samuel E. Thomas
N. S. Wright

INVENTOR
Solon G. Howe
By W. W. Leggett
Attorney

(No Model.)  
6 Sheets—Sheet 5.

S. G. HOWE.
CAR COUPLING.

No. 369,523. Patented Sept. 6, 1887.

WITNESSES  
Samuel E. Thomas  
N. S. Wright

INVENTOR  
Solon G. Howe  
By W. W. Leggett  
Attorney

(No Model.)  6 Sheets—Sheet 6.

S. G. HOWE.
CAR COUPLING.

No. 369,523.  Patented Sept. 6, 1887.

WITNESSES
Samuel E. Thomas
N. S. Wright

INVENTOR
Solon G. Howe
By G. W. Type
Attorney

UNITED STATES PATENT OFFICE.

SOLON G. HOWE, OF DETROIT, MICHIGAN, ASSIGNOR OF ONE-HALF TO CYRENUS A. NEWCOMB, OF SAME PLACE.

CAR-COUPLING.

SPECIFICATION forming part of Letters Patent No. 369,523, dated September 6, 1887.

Application filed May 6, 1887. Serial No. 237,343. (No model.)

*To all whom it may concern:*

Be it known that I, SOLON G. HOWE, of Detroit, county of Wayne, State of Michigan, have invented a new and useful Improvement in Car-Couplers; and I declare the following to be a full, clear, and exact description of the same, such as will enable others skilled in the art to which it pertains to make and use it, reference being had to the accompanying drawings, which form a part of this specification.

My invention relates to an improved automatic car-coupler and its attachments, and has for its objects, first, to provide a reversible draw-head provided with a hook and a preferably bell-shaped mouth, whereby the hooks of two similarly-constructed devices may be engaged together, or whereby the head may be shifted for the employment of an ordinary link-and-pin coupling; second, to provide novel mechanism for the automatic operation of an ordinary pin; third, an improved construction of the draw-bar; fourth, the peculiar engagement of the draw-head in the draw-bar; fifth, improved mechanism for uncoupling the draw-heads when used in the form of a hook-coupler and to prevent their accidental disengagement; sixth, the construction of the draw-head, adapting it for a buffer when used as a hook-coupler; seventh, the construction of the draw-head and its engagement with the draw-bar in such a manner that its use as buffer, whether employed as a hook-coupler or with an ordinary link-and-pin coupler, shall communicate the compression upon a single buffer or draft spring; eighth, improved mechanism for locking the draw-head in a desired position; ninth, novel mechanism for releasing the draw-heads or uncoupling devices and allowing them to resume their normal position for recoupling automatically when the device is used as a hook-coupling or a hook-and-link coupling; tenth, my invention also consists in the general construction and arrangement of devices, as hereinafter more particularly described, and more definitely pointed out in the claims.

I carry out my invention as follows:

A A' represent the car-bodies; A², the spring-timbers underneath the body; A³, a dead-wood block.

Figure 12:
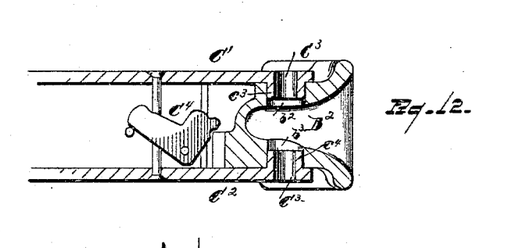
Fig. 12 is a vertical longitudinal section of a draw-head and draw-bar, illustrating a modification of the manner of engaging the two together.

B represents my improved draw-head, and C any suitable draw-bar constructed to receive said head. The draw-bars are constructed in two or more parts, as shown, and consist, preferably, of a base-plate, C', and a top plate, C², said base and top plates provided with any suitable fastening for engaging them properly together—as, for instance, by means of rivets c, or otherwise. Each of said plates of which the draw-bar is arranged has a central pivotal engagement of the draw-head therewith, which may be done by recessing said plates, respectively, as shown at c' c² in Fig. 2, the draw-head being constructed with corresponding bearings or shoulders, b b', fitted into said recesses, respectively, of the upper and lower plates of the draw-bar; or the construction may be vice versa, as shown in Fig. 12, the draw-head being recessed, as shown at b² b³, the upper and lower plates of the draw-bar provided with corresponding bearings, c³ c⁴. Toward the rear ends of the respective plates of the draw-bar they are constructed to form a journal for the reception of the buffer-spring bolt D—as, for instance, the upper and lower plates are constructed with shoulders c⁵ c⁶, the head D' of said bolt engaging about the said journal-bearing, the construction being such that a horizontal movement is provided for the draw-bar at the point of its engagement with the buffer-spring bolt.

My improved draw-head is constructed both with a hook, B', for use as a hook-coupling, and also with a mouth or recess, B², to adapt the head for use with an ordinary coupling link and pin, the adjacent parts of the draw-head and draw-bar being constructed with a vertical recess, C³, to receive a coupling-pin, E. This recess may extend through the journal and bearing of the draw-head and draw-bar, respectively.

An important feature of my invention consists in the construction of the journal and journal-bearing of the draw-bar and draw-head, respectively, in such a manner that the draw-head will always have a central pivotal engagement in the end of the draw-bar, and so as to permit the shifting of the draw-head in a horizontal plane, either to adapt it as a link-and-pin coupling or a hook-coupling at the will of the operator.

Figure 1:
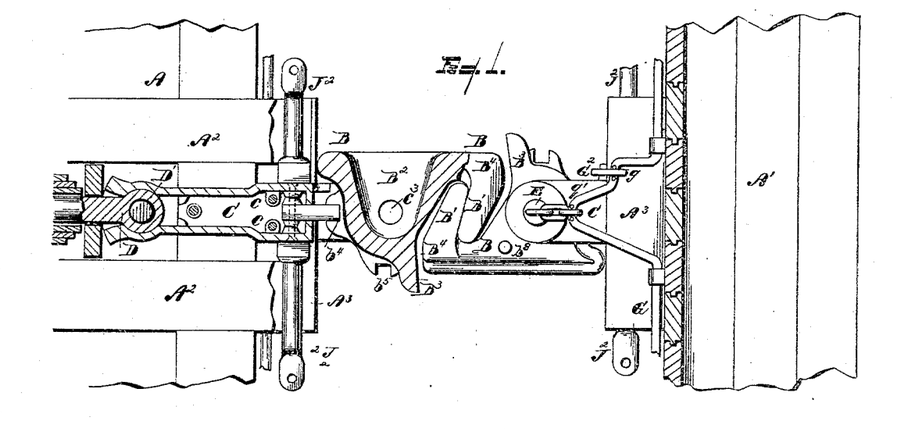
Figure 1 is a plan view of my improved coupler, showing parts in horizontal section, the draw-heads being arranged to act as a hook coupler.
Figure 2:
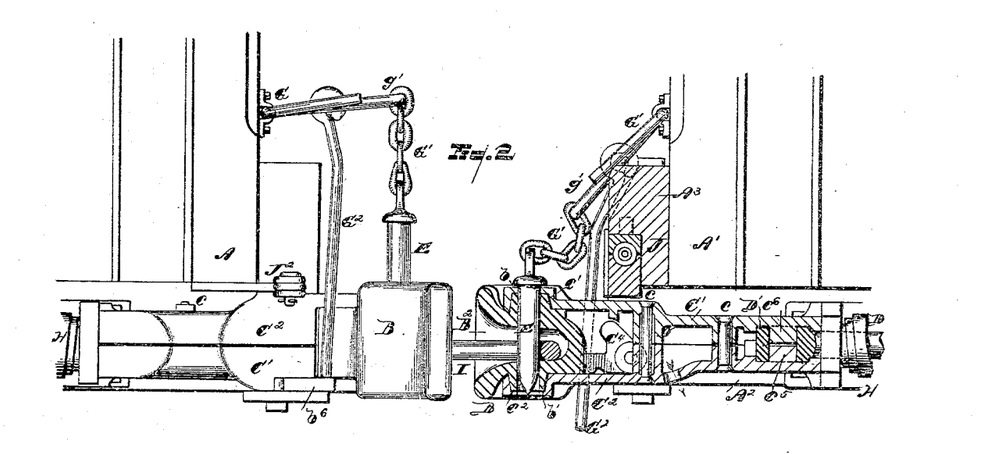
Fig. 2 illustrates the same in side elevation and vertical section, the draw-heads being arranged as an automatic link-and-pin coupler.
Figures 3, 7:
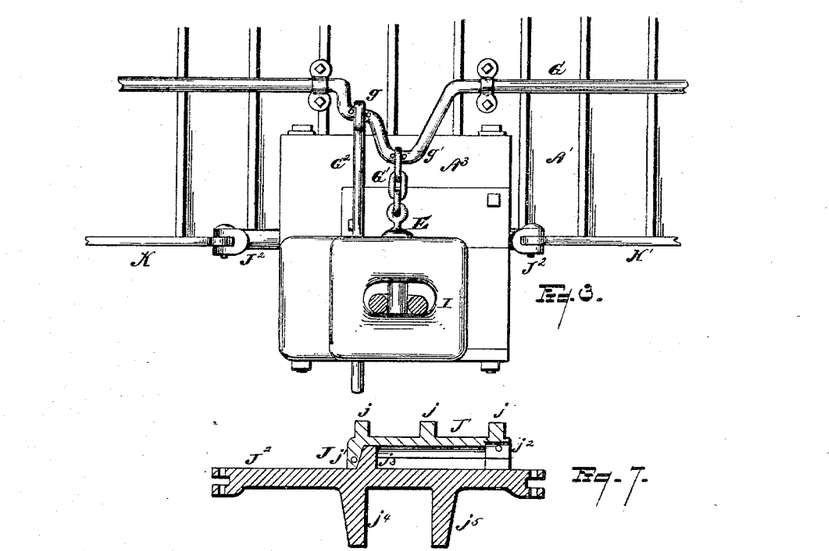
Fig. 3 is a front elevation showing the draw-head arranged as a link-and-pin coupling.
Fig. 7 is a vertical section of the same.

In Fig. 1 the draw-head is illustrated as shifting in the draw-bar to constitute a hook-coupling, and in Fig. 2 the draw-head is shown as shifted to constitute a link-and-pin coupling.

To adapt the draw-head for either form of coupling, it is simply necessary to give it a quarter-turn in its engagement with the draw-bar, the hook being thus turned out of the way if it is desired to use it as a link-and-pin coupling, and vice versa. In either case, the pivotal engagement of the draw-head with the draw-bar being a central one, the draft will always come upon the center of the draw-head in the central line of draft and be communicated therefrom centrally to the draw-bar.

To firmly secure the draw-head in either of the positions desired, the draw-bar is provided with a gravity ratchet or dog, C⁴, having a pivotal engagement in said draw-bar, as shown at c⁷. The adjacent parts of the plates of the draw-bar are preferably provided with lips c⁸, to limit the lateral movement of said ratchet, the said plate being also recessed to permit the ratchet being disengaged from the draw-head and thrown over out of the way, as shown in Fig. 12. The draw-head is constructed with corresponding recesses, b⁴ b⁵, to engage with said ratchet and lock the head in a given position, although one of these recesses might be dispensed with, as when used with a link-and-pin coupling. It is not indispensable that the head be locked in the corresponding position. The journal-bearing of the draw-bar being central, the pin E may be located in its socket when the head is used as a hook-coupling, as shown in Fig. 1, as it is out of the way and adds to the firmness of the support of the head in the draw-bar.

It will be understood that ordinarily when two adjacent cars are each provided with a corresponding coupling of this construction it will be used as a hook-coupling, as shown in Fig. 1. When, however, one of the cars is provided with another coupling, they may be readily coupled with a link-pin, as shown in Fig. 2, thus adapting my improved coupler for use with different varieties of couplers where the train is made up of cars provided with different couplings.

The draw-head is constructed for use as a link-and-pin coupling with a broad bell-shaped mouth, as shown, thus facilitating its coupling with a great variety of couplers, as abundant room is thereby afforded for the entrance of the link.

Figure 4:
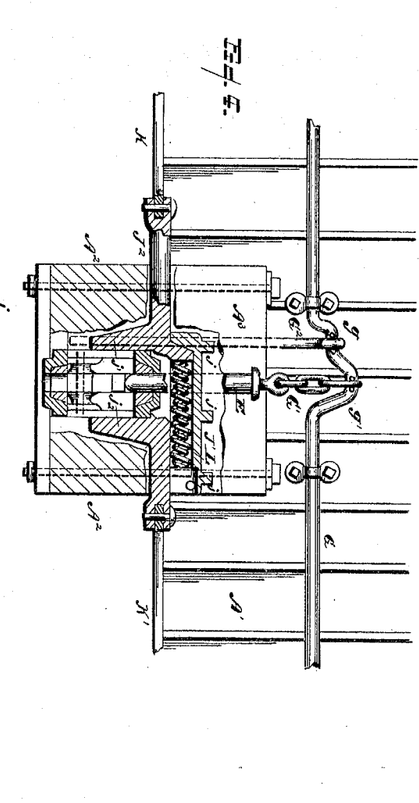
Fig. 4, a vertical cross-section of the same with parts in elevation.
Figure 5:
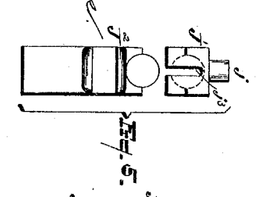
Fig. 5 is a view in elevation of the spring-barrel viewed from the side of the car, the two parts of which it is constructed being separated.
Figure 6:
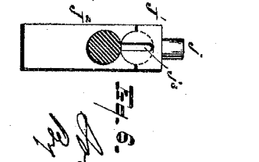
Fig. 6 is a similar view of the same, showing the two parts of which the barrel is composed engaged together.

To automatically operate the pin E, I provide the front of the car with a rotatable crank-shaft, G, said shaft being bent out to form a double crank, as shown at g g'. At g' the shaft is provided with a chain, G', connecting the pin therewith. At the points g the shaft is provided with a depending leg, G², pivotally engaged therewith. The lower plate of the draw-bar is constructed with the step b⁶, engaged therewith, upon which the foot of said leg may rest, and thereby support the crank-shaft, with the pin in a proper position for coupling upon the entrance of the link in the draw-head, the pin being entered in its socket and supported, as shown in the left hand of Fig. 2, ready for coupling. Now, upon the approach of the cars to be coupled the concussion upon the draw-bar will compress the buffer-spring H and permit the draw-bar to retract, whereby the lug supporting the leg G² is forced backward, and the leg, with said crank-shaft and pin, automatically drops to the position shown at the right hand of Fig. 2, thereby effecting the coupling of the pin with the link I, the dead-wood block in the rear of said leg preventing the rearward movement of said leg. If it be desired to throw the pin entirely out of its socket, the crank-shaft may be turned up in the position shown in Fig. 4, the dead-wood block being recessed, as shown at $a$, to receive said leg. The dead-wood block may also be recessed to receive the lower end of the pin, as shown at $a'$.

The crank-shaft, it will be understood, extends to either side of the car, and may be provided with any locking mechanism. It may also be provided with a rod or chain running to the top of the car. This construction and arrangement of the crank-shaft with its leg-and-pin engagement forms an important feature of my invention, and I would have it distinctly understood that I do not limit myself to its employment with a coupling of the particular description herein shown and described, as this particular feature may also be used, obviously, with any coupling or draw-bar where the link and pin are employed, and it is my intention, therefore, to cover this feature, broadly, in combination with any draw-bar or coupling device to which it may be found adapted.

When the device is used as a hook-coupling, it will be understood that the draw-heads are set in their normal position. The outer faces of the hooks being beveled, the contact of two approaching draw-heads will cause their respective hooks to ride the one past the other to form the engagement of their respective hooks together, the draw-bars yielding laterally about their journal engagement with the buffer-spring bolt. In order to unlock the hook-coupling, I provide the following mechanism:

J represents what may be termed a "spring-barrel," constructed in two parts, the part $J'$ being firmly engaged in the dead-wood block and prevented from lateral movement by means of lugs $j$, extending into the corresponding recesses in said block. This portion of the spring-barrel has a continuous and immovable engagement. The other portion of said barrel, $J^2$, is constructed to have a lateral movement and is engaged at its extremities with operating-bars K K', extending to the sides of the car. The portion $J'$ is constructed with downward extensions $j'$ $j^2$, the portion $j'$ forming a stop for the portion $J^2$ of the barrel, and the opposite extension, $j^2$, provides a stop for the adjacent end of the spring L, inclosed in said barrel.

$j^3$ is an upward projection on the portion of the barrel $J^2$ and forms a bearing for the adjacent end of the spring. The lower portion of the barrel is constructed with dependent flanges or shoulders $j^4$ $j^5$, which engage astride the draw-bar, and it will be evident that by means of the operating-rods connected with the portion $J^2$ the draw-bar may be shifted in either direction, as may be desired, to uncouple the hooks. I do not limit myself to this precise location of this draw-bar-actuating mechanism, as it might be located so as to engage the draw-bar from below, or it might engage the draw-bar by other means than of the downwardly-projecting shoulders or flanges, without departing from the principle of my invention. It is evident that the spring will be compressed to permit the shifting of the draw-bar and will restore it to its normal position.

Engaged with the outer ends of the operating-rods K K', I provide levers M M', pivotally engaged underneath the car-body and connected at their forward extremities with said operating-rods, respectively, and by which the action of uncoupling may be more readily effected.

To lock the draw-heads in an open position when it may be desired, I provide suitable ratchets or dogs, N N', pivotally engaged underneath the car-body, the operating-rods being provided with a ratchet-tooth, $k$ $k'$, to engage with said ratchet.

Figure 9:
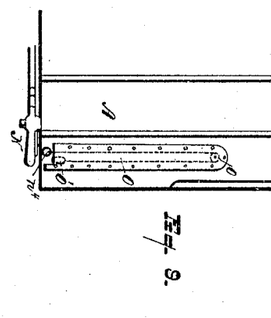
Fig. 9 is an end elevation showing mechanism for releasing the uncoupling device.
Figures 10, 11:
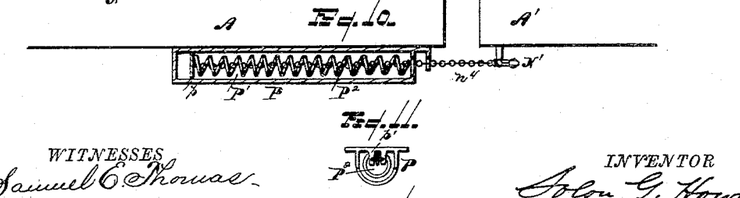
Fig. 10 is a side elevation illustrating a modification of the same.
Fig. 11 is an end view thereof.

To operate the ratchet, it may be provided with a rod or cord, $n$ $n'$, respectively, leading back under side the handle of the adjacent lever, so that when the draw-head is opened the ratchet may be readily engaged to hold the draw-head in position. The same mechanism will of course enable the operator to release the ratchet whenever desired. In case it is desired to release the ratchets automatically, so as to restore the draw-heads to their normal position ready for coupling, the ratchets may be provided with a horn, $n^2$ $n^3$, upon which the link or chain ring $n^4$ $n^5$ may be slipped, said chains being engaged at their opposite ends with the adjacent car. It will thus be readily seen that when said adjacent car is pulled away the ratchet will be first tilted to release it from the operating-rod, and a further movement will cause the chains to slip off from the horn of the ratchet. The means of engaging said chains upon the adjacent cars is shown in Figs. 9, 10, and 11, the one being a modification of the other. Thus on a box-car I may provide the casing O to receive the chain, the chamber underneath the casing being provided with a pulley, $o$, at its upper end, over which said chain is passed, the opposite extremity of the chain being provided with a weight, $o'$, which, when the chain is released from the horn, will automatically lift the chain into the chamber of the casing out of the way, or, as shown in Figs 10 and 11, the chamber P may be located underneath the car, the chamber P' of said casing inclosing a retracting-spring, $P^2$. The chain is engaged to a plate, $p$, at the extremity of the spring opposite the ratchet, the forward end of the casing being open to permit the passage of said chain through the same. It will be obvious that the tension of the spring might tend to liberate the ratchet before it was desired, unless some provision were made to guard against the same. I therefore provide at the front of the case lips $p'$, as shown in Fig. 11. A link of the chain may be readily inserted between said lips, and thereby the strain of the spring will be relieved entirely from the forward portion of the chain engaged with the ratchet until the chain is freed from the ratchet, when it will naturally drop from between said lips, and then the spring will retract the chain into the case out of the way.

Figure 16:
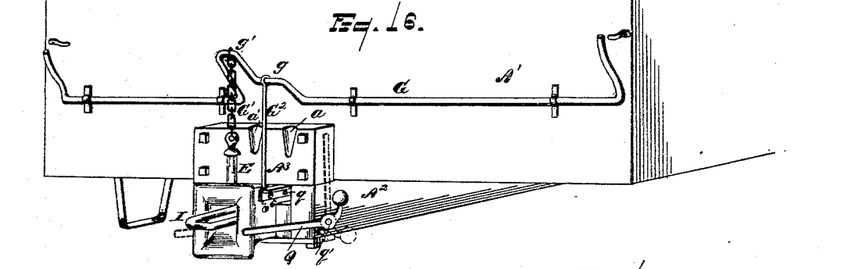
Fig. 16 is a perspective view illustrating my pin-operating bar as applied to an ordinary link-and-pin coupling.
Figure 17:
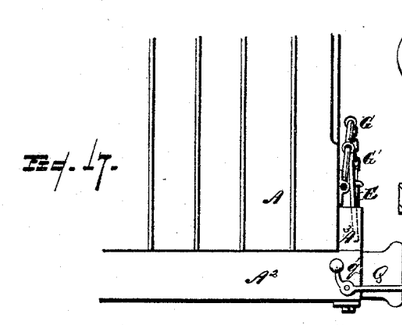
Fig. 17 is a side elevation showing the pin-operating mechanism thrown up out of the way and the link-guiding mechanism in its normal position.

In Fig. 16 I show the pin-operating mechanism employed with an ordinary link-and-pin coupling. The crank-shaft employed is similar to that already described, and is provided with a pin-connection and the leg already referred to. A piece of angle or other suitable iron, q, is engaged in any proper manner upon the draw-bar to form a step for the foot of the leg to support the rock-shaft, and thereby the pin, in a position to effect the coupling upon the entrance of the link into the draw-head. The concussion will force the draw-bar rearwardly, thereby disengaging the leg from its support, when the pin will drop and automatically engage with the link.

Figure 13:
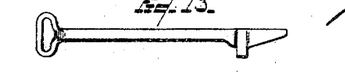
Fig. 13 is a view of a tool which may be employed to shift the draw-head or guide the coupling-link.
Figure 14:
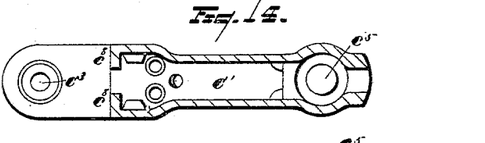
Fig. 14 is an inverted plan of the base of the draw-bar.
Figure 18:
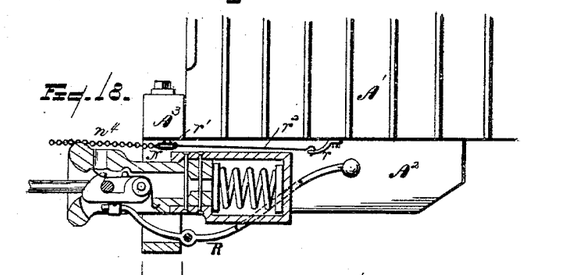
Fig. 18 is a view in elevation and vertical section illustrating the releasing mechanism extended from one car to another and applied to release the uncoupling device of a link-and-hook coupling.
Figure 19:
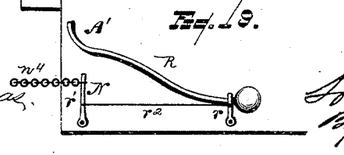
Fig. 19 is an inverted plan of the same.
Figure 20:
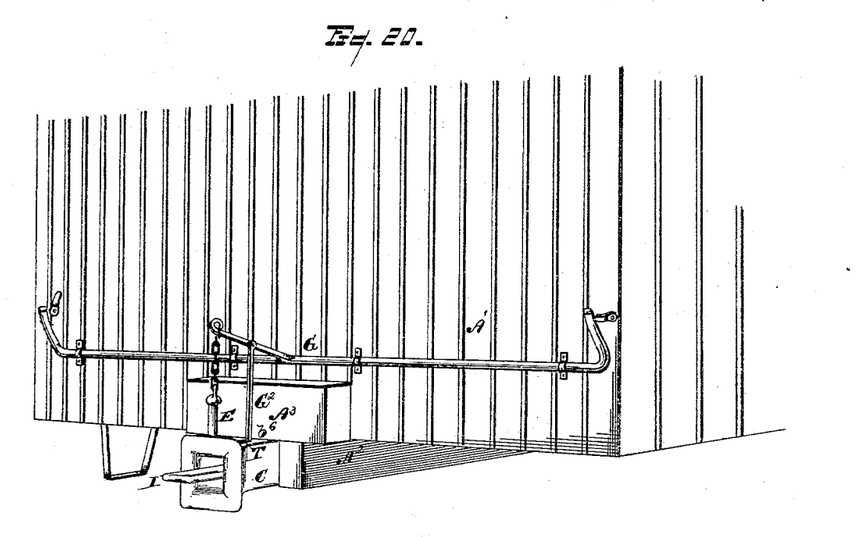
Fig. 20 is a perspective view showing a modification of the pin-operating mechanism.

An important feature of my device in this connection is the employment of a suitable tool-rest, Q, pivotally engaged upon the spring-timber, as shown at q', and which may be weighted, so as to counterbalance the forwardly-extended end of the same, so that when not in use the rest may be readily tilted out of the way into the position shown in dotted lines. The forward end of the rest is extended when thrown down for use, well to the front of the draw-bar, so that any suitable tool or stick—such, for instance, as is shown in Fig. 13—may be inserted between the cars and find a bearing upon said rest, and thereby the link be picked up and held in the proper position for its entrance in the corresponding draw-head. When this has been accomplished, said rest may be tilted out of the way, as already described. Any ordinary coupler may thus be provided with this device economically, and thereby the operation of coupling be greatly facilitated, the engagement of the pin being automatic. Should other means be employed for holding the link in proper position for coupling, the rest Q might be dispensed with. The device already described for engaging the ratchet mechanism in Figs. 8, 9, 10, and 11 may also be employed to automatically release the operating-bar R of a hook-and-link coupler, as shown in Figs. 18 and 19, such a coupler forming the subject-matter of Letters Patent granted to me of date October 12, 1886. In this instance the arm r, engaged upon the body of the car and adapted to support and hold the outer extremity of the operating-bar, is connected with a tilting arm, r', upon which the chain $n^4$ is engaged in a manner similar to its engagement with the ratchet of Fig. 8. The forward end of the chain is engaged to the adjacent car in any proper manner, and as described hereinbefore.

It will be observed, therefore, that when the forward car is moved the tilting arm, engaged with the supporting-arm r by a connecting-bar or link, $r^2$, will be tilted forward, thereby releasing the supporting-arm from the operating-bar, and when the tilting arm is thrown forward the chain will be disengaged therefrom. This may be readily applied to any cars furnished with a link-and-hook coupler of various descriptions in an economical manner. The hook is thereby automatically set into proper position for coupling. I have before described the operating-bar with which the pin and supporting-leg are engaged as bent to form a double crank intermediate of its ends, the leg being engaged upon one crank-arm and the pin upon another. My invention, however, contemplates as coming within its scope the continuation of the operating-bar across the car, the same being provided with a projecting arm, upon which both the leg and the pin may be supported. This device is adapted for use with any ordinary link-and-pin coupling. The draw-bar may be perforated, as shown at T, preferably with an elongated perforation, the leg being supported in the normal position of the draw-bar at the rear of said perforation and in line with the same, so that when the draw-bar is compressed the leg will be forced from its rest and thereby into said perforation, thereby permitting the automatic engagement of the pin with the link.

Figures 21, 22:
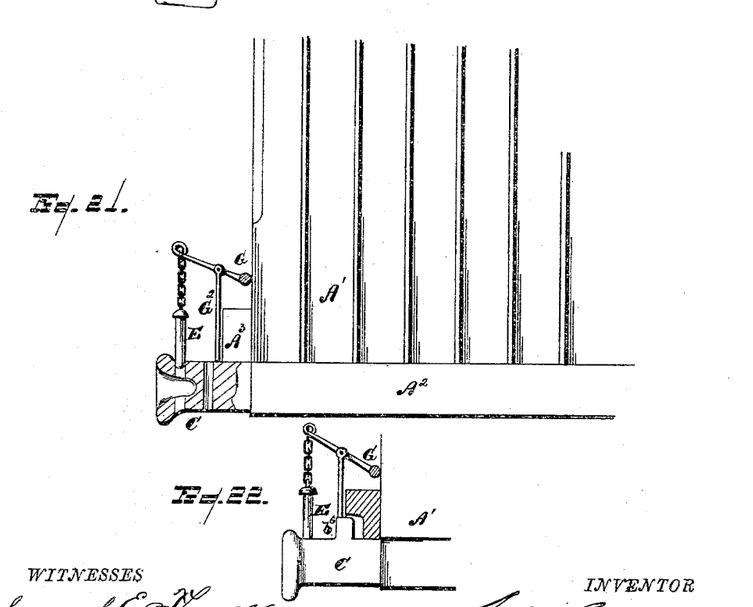
Fig. 21, a side elevation of the same with parts in section.
Fig. 22 represents a modification, with an elevated step for the supporting-leg.
Figure 23:
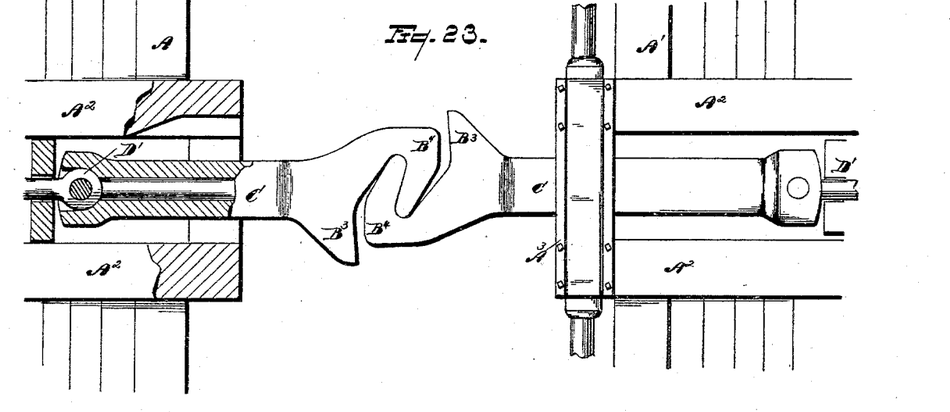
Fig. 23 is an inverted plan showing parts in section, wherein the hook is made integral with the draw-bar.

Fig. 22 presents another modification designed for the same purpose, in which the draw-bar is provided with an elevated step to support the leg, the dead-wood block being recessed to receive said step. When the draw-bar is compressed, the leg is forced off from the step, permitting the pin to drop.

Where it is desired to equip cars with a hook-coupling, I would have it understood that the draw-head constructed with a hook may be rigidly or integrally connected with the draw-bar, as shown in Fig. 23, the whole idea being essentially the same as when my reversible draw-head is locked into position as a hook-coupler; but it will be seen that when the link-and-pin-coupling feature is undesirable that feature of the draw-head might be entirely omitted and the head rigidly engaged with the draw-bar. In either case the draw-head, when used as constructed for a hook-coupling, is provided with a projecting head or shoulder, $B^3$, to adapt the head as a buffer to receive the contact of the hook on the adjacent car, said hook being preferably constructed with a corresponding outer face, as shown at $B^4$, to form an impact against said shoulder $B^3$. The draw-head and buffer are thus made integrally.

Figure 24:
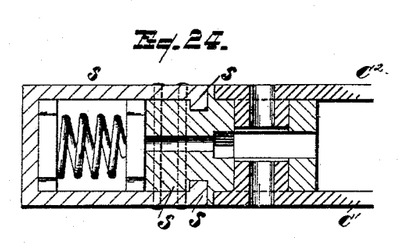
Figs. 24 and 25 are modifications of the buffer-spring fastening.

I do not limit myself to any one form of engaging the buffer-spring to the draw-bar. Thus in Fig. 24 I have shown a buffer-spring fastening consisting of a loop or U-shaped casing, S, inclosing the buffer-spring, said fastening provided with engaging-shoulders s s', engaged in corresponding recesses in a supplemental spring-block, S', engaged about the journal-bearing of the upper and lower plates of the draw-bar.

Figure 25:
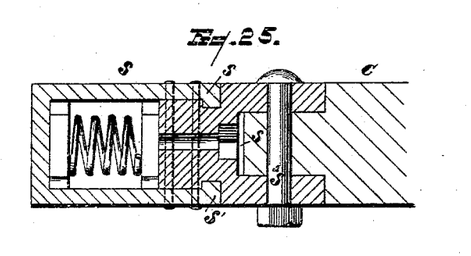

As shown in Fig. 25, the supplemental spring-block is made in a modified form, being recessed, as shown at s, to receive a corresponding tenon upon the rear end of the draw-bar, the two being held in engagement by a bolt, S², the draw-bar in this case being preferably constructed of a solid piece of metal, as shown in Fig. 23.

Figures 26, 27, 28:
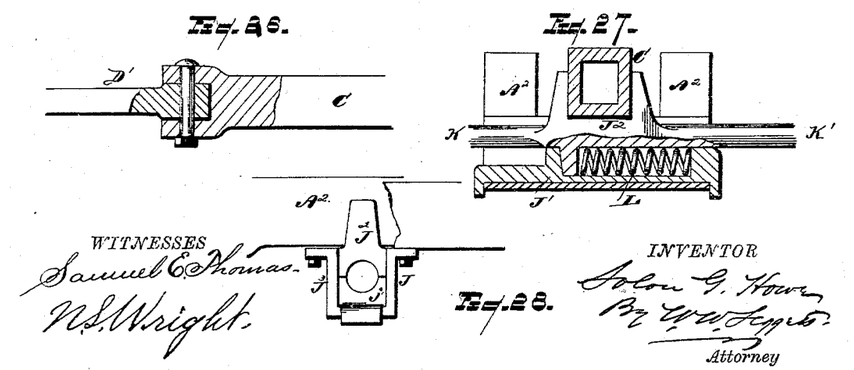
Fig. 26 is a vertical section of the engagement of the spring-bolt and draw-bar shown in Fig. 23.
Fig. 27 is a vertical section showing the uncoupling mechanism engaged with the draw-bar from beneath.
Fig. 28 is a side view of the same.

In Fig. 26 the rear of the draw-bar is connected with a simple spring-bolt. Where the uncoupling mechanism is engaged with the draw-bar from beneath, the fixed portion of the spring-barrel J', instead of being engaged in the dead-wood block, may have a fixed engagement upon a stirrup, J³, engaged upon the spring-timbers.

Figure 8:
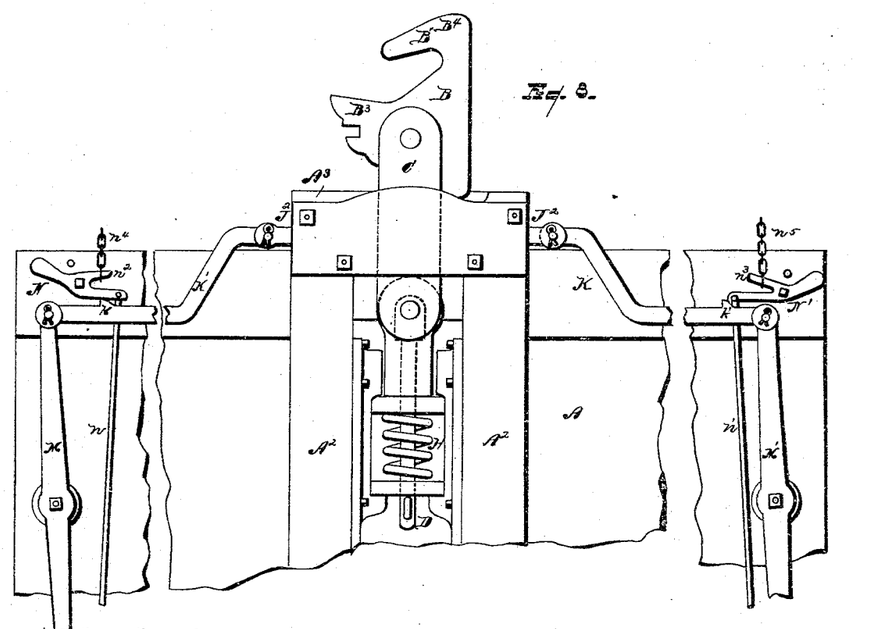
Fig. 8 is an inverted plan view.

It should be understood in connection with the automatic releasing device shown in Figs. 8, 9, 10, and elsewhere that the chain or cable should have sufficient slack to permit the movement of the forward car sufficient to uncouple their respective hooks before the locking-pawls shall be released to permit the retraction of the draw-heads to their normal position. To operate the reversible draw-head without the necessity of going between the cars, they may be provided with a socket, b⁹, as shown in Fig. 1, in which the heel of the tool shown in Fig. 13 may be engaged to shift the draw-bar, as desired. So, also, to obviate the necessity of going between the cars to operate the locking-ratchet C⁴, it may be recessed upon its lower side, as shown in Fig. 2, so that the point of said tool or similar instrument may be inserted thereunder to tilt the ratchet. It will be obviously necessary to compress the spring in the spring-barrel J in the operation of engaging the two sections J' and J² together. This may be done in any suitable manner—as, for instance, at one end of said sections a recess, j³, may be provided, through which a proper tool may be inserted bearing upon the spring to secure its compression. Said spring should be given a considerable degree of compression, so as to hold the draw-bars in their normal position and prevent any accidental displacement of the hooks.

I have described the reversible draw-head as centrally journaled in the draw-bar, by which I mean that it is journaled in the center of the line of draft.

Figure 15:
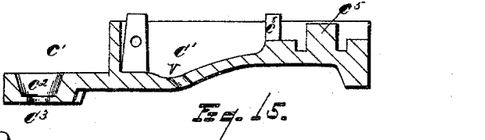
Fig. 15, a vertical section of the same.

In cases where draw-bars are made in sections—as, for instance, as shown in Fig. 15—a hollow space will ordinarily be left intermediate the ends, in which water might accumulate, as from snow and ice, and also dirt. I therefore prefer to construct the same in a suitable orifice, V, by which the water and dirt may conveniently escape.

What I claim is—

1. The combination, with a draw-bar, of a reversible draw-head journaled therein on the central line of draft, whether coupled with the hook or a link, by a journal whose axis is horizontal and longitudinal with the car, substantially as described.

2. The combination, with a draw-bar, of a reversible draw-head journaled therein on the central line of draft, whether coupled with a hook or a link, said draw-bar made in sections secured together, substantially as and for the purpose described.

3. The combination, with a draw-bar, of a reversible draw-head journaled therein on the central line of draft, whether coupled with the hook or a link, said bar made in sections secured together and having a laterally movable engagement with the buffer-spring fastening, substantially as described.

4. The combination, with a draw-bar, of a reversible draw-head constructed with a hook and an open mouth, said head journaled in said bar on the central line of draft, whether coupled with the hook or a link, by a journal whose axis is horizontal and longitudinal with the car, and having a locking device to hold said head in a given position, substantially as described.

5. The combination, with a draw-bar made in sections, of a reversible draw-head journaled therein on the central line of draft, whether coupled with the hook or a link, the engagement of said head in said bar being by means of an extended journal upon the one located in a corresponding bearing upon the other, substantially as described.

6. The combination, with a draw-bar provided at one end with a buffer-spring fastening, of a reversible draw-head constructed with a hook and an open mouth, and journaled in said bar on the central line of draft, whether coupled with the hook or a link, by a journal whose axis is horizontal and longitudinal with the car, the construction being such that the said head will always be in position to compress the buffer-spring on the central line of draft, substantially as described.

7. The combination, with a draw-bar, of a reversible draw-head journaled therein on the central line of draft, whether coupled with the hook or a link, said bar provided with a gravity-ratchet to engage said head and hold it in a given position, substantially as described.

8. The combination, with a draw-bar, of a reversible draw-head journaled therein, the engagement of said head in said bar being by means of an extended journal on the one located in corresponding bearings upon the other, said bar and head provided with a vertical orifice through the center of said journal and bearing for the reception of a coupling-pin, substantially as described.

9. The combination, with an operating-bar, of a coupling-pin and a supporting-leg connected with said operating-bar, said supporting-leg adapted to be tripped by an adjacent stationary part of the car as the draw-head is forced inward in coupling, substantially as and in the manner described.

10. The combination, with a car-body and a draw-bar, of an operating-bar having a coupling-pin and supporting-leg connected with said operating-bar, said draw-bar provided with a step to support said leg and thereby hold the pin ready for engagement, the construction being such that on the compression of the draw-bar said leg will be forced from its support upon the step, and thereby permit the descent of the pin, all substantially as and in the manner described.

11. The combination, with a car-body, of an operating-bar and coupling-pin, and a supporting-leg connected therewith upon one or more crank-arms, and a locking device to hold said operating-bar with its connecting pin and leg out of the way, substantially as described.

12. The combination, with a draw-bar having a lateral movement at its forward end and provided with a hooked draw-head, of uncoupling mechanism connected with said bar, said uncoupling mechanism engaged with an automatically-releasable locking device attached to the other car and adapted to release the engagement as the cars separate, substantially as described.

13. The combination, with a car-body, of a draw-bar provided with a hooked draw-head and having a lateral movement at its forward end, of uncoupling mechanism engaged with said draw-bar, a pivoted dog or pawl provided with a horn and arranged to lock said draw-bar in an open position, and in connection therewith a chain or cable engaged upon the adjacent car, constructed to removably engage said horn, the construction being such that said dog will be automatically released by the movement of the said adjacent car, substantially as described.

14. The combination, with a car-body, of a draw-bar provided with a hooked draw-head and having a lateral movement at its forward end, of uncoupling mechanism engaged with said draw-bar, a pivoted dog or pawl provided with a horn and arranged to lock said draw-bar in an open position, and in connection therewith a chain or cable provided with retracting mechanism engaged upon an adjacent car and constructed to removably engage said horn, the construction being such that said dog will be automatically released by the movement of the adjacent car, substantially as described.

15. The combination, with a car-body, of a draw-bar provided with a hooked draw-head and having a lateral movement at its forward end, of uncoupling mechanism engaged with said draw-bar, a pivoted dog or pawl arranged to lock said draw-bar in an open position, and in combination therewith a chain or cable provided with retracting mechanism, and a housing engaged upon an adjacent car and constructed to removably engage said dog, the construction being such that said dog will be automatically released by the movement of the said adjacent car and the chain or cable be retracted into said housing, substantially as described.

16. The combination, with a car-body, of a pivoted pawl or dog adapted to hold the coupling mechanism in uncoupled position, and in connection therewith a chain or cable engaged upon an adjacent car and constructed to removably engage said dog or pawl, the construction being such that said dog or pawl will be automatically tripped by the movement of the adjacent car as the cars separate and restore the mechanism to a position for automatic coupling, substantially as described.

17. A car-coupling device consisting of the combination, with the car-body provided with a draw-bar having a lateral movement at its forward end, of an uncoupling device consisting of a spring-barrel inclosing a retracting-spring, said barrel constructed with a fixed section and a movable section engaged with said draw-bar, substantially as described.

18. The combination, with a car-body provided with a draw-bar having a lateral movement at its forward end, of an uncoupling device consisting of a spring-barrel inclosing a retracting-spring, said barrel constructed with a fixed section and with a movable section engaged with said draw-bar, said movable section provided with operating-bars, substantially as described.

19. The combination, with a car-body provided with a draw-bar having a lateral movement at its forward end, of an uncoupling device provided with an operating-rod and an operating-lever engaged therewith, and a dog to engage said rod provided with an operating-bar, and in connection therewith a chain or cable connected with an adjacent car, constructed to removably engage said dog, all constructed and arranged to operate substantially as and in the manner described.

20. The combination, with a car-body provided with a draw-bar having a lateral movement at its forward end, of an uncoupling device, a dog for holding the bar in uncoupled position, and a rod connected with said dog, whereby it may be tripped at will, substantially as described.

21. The combination, with a car-body provided with a draw-bar, of an uncoupling device consisting of a spring-barrel made with a fixed and a movable section, said sections provided with a recess for the compression of the spring on the engagement of said sections, substantially as described.

22. The combination, with a car-body, of a link-guide pivotally engaged therewith, the construction being such that said guide may be tilted out of the way and into position for use, substantially as described.

23. The combination, with a draw-bar having a lateral movement at its forward end, of a draw-head constructed with a hook and a buffer-head or shoulder made integral therewith, substantially as described.

24. A draw-head constructed with a hook and an open mouth adapting said head to be used either as a hook or a link-and-pin coupler at the will of the operator, said head constructed with a projecting buffer-head or shoulder, B³, and said hook with a corresponding buffer-face, substantially as described.

25. The combination, with a draw-bar made in sections secured together, of a reversible draw-head journaled therein, said draw-head constructed with a hook and an open mouth adapting said head to be used either as a hook or link-and-pin coupler at the will of the operator, substantially as described.

26. The combination, with a draw-bar having a lateral movement at its forward end, of a reversible draw-head journaled therein and mechanism to move said draw-bar laterally for uncoupling said hook, substantially as described.

27. The draw-head constructed with a hook and with an open mouth, adapting it for use either as a hook or a link-and-pin coupler at the will of the operator, said head constructed with a journal or journal-bearings, said journal or journal-bearings inclosing a vertical pin-socket, substantially as described.

28. A draw-bar made in sections, one of said sections provided with an orifice, V, substantially as and for the purposes described.

In testimony whereof I sign this specification in the presence of two witnesses.

SOLON G. HOWE.

Witnesses:
N. S. WRIGHT,
M. B. O'DOGHERTY.